(12) United States Patent
Suzuki et al.

(10) Patent No.: US 8,617,508 B2
(45) Date of Patent: Dec. 31, 2013

(54) CARBON MATERIAL FOR NEGATIVE ELECTRODE OF LITHIUM SECONDARY BATTERY AND METHOD FOR PRODUCING THE SAME

(75) Inventors: Takashi Suzuki, Yokohama (JP); Akio Sakamoto, Tokyo (JP); Tamotsu Tano, Yamaguchi (JP); Kazuhisa Nakanishi, Yamaguchi (JP); Takashi Oyama, Yamaguchi (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/422,513

(22) Filed: Mar. 16, 2012

(65) Prior Publication Data

US 2012/0171572 A1    Jul. 5, 2012

Related U.S. Application Data

(63) Continuation of application No. PCT/JP2010/066096, filed on Sep. 16, 2010.

(30) Foreign Application Priority Data

Sep. 18, 2009 (JP) ................................. 2009-217842

(51) Int. Cl.
*C01B 31/04* (2006.01)
(52) U.S. Cl.
USPC ..................... 423/448; 423/460; 429/231.8
(58) Field of Classification Search
USPC ................................................ 423/448, 460
See application file for complete search history.

(56) References Cited

U.S. PATENT DOCUMENTS

| | | | |
|---|---|---|---|
| 2003/0134201 A1 | 7/2003 | Sato et al. | |
| 2006/0035146 A1* | 2/2006 | Hayashi et al. | 429/217 |
| 2006/0147799 A1 | 7/2006 | Hayashi et al. | |
| 2006/0292447 A1 | 12/2006 | Suzuki et al. | |
| 2010/0009193 A1* | 1/2010 | Takeda et al. | 428/408 |
| 2011/0262802 A1* | 10/2011 | Uono et al. | 429/188 |
| 2011/0288351 A1* | 11/2011 | Tano et al. | 585/1 |

FOREIGN PATENT DOCUMENTS

| | | |
|---|---|---|
| JP | 09-55209 A | 2/1997 |
| JP | 10-284081 A | 10/1998 |
| JP | 2000-243398 A | 9/2000 |
| JP | 2000-306582 A | 11/2000 |

(Continued)

OTHER PUBLICATIONS

Sawarkar, A. et al. "Petroleum Residue Upgarding Via Delayed Coking: A Review" The Canadian Journal of Chemical Engineering. vol. 85, Issue 1, Article first published online: May 19, 2008.*

(Continued)

*Primary Examiner* — Stanley Silverman
*Assistant Examiner* — Richard M Rump
(74) *Attorney, Agent, or Firm* — Foley & Lardner LLP (57) ABSTRACT

To provide a negative electrode carbon material capable of suppressing capacity degradation which will occur due to repetition of a charge/discharge cycle, storage under a charged state, float charging, or the like. An artificial graphite for a negative electrode of a lithium secondary battery having a c-axis crystallite size L (112) of from 2.0 to 4.2 nm as calculated from a (112) diffraction line obtained by X-ray wide-angle diffractometry and having a half-value width $\Delta v_G$ of from 15 to 19 $cm^{-1}$ for a peak appearing in a wavelength region of from 1580 $cm^{-1} \pm 100$ $cm^{-1}$ in the Raman spectroscopy using an argon ion laser light having a wavelength of 5145 angstrom.

5 Claims, 1 Drawing Sheet

(56) References Cited

FOREIGN PATENT DOCUMENTS

| JP | 2000-348727 A | 12/2000 |
|---|---|---|
| JP | 2004-273444 A | 9/2004 |
| JP | 2009-087871 A | 4/2009 |
| JP | 2009-117256 A | 5/2009 |
| WO | WO 2004/034491 A1 | 4/2004 |
| WO | WO 2006/109497 A | 10/2006 |
| WO | WO 2008078679 A1 * | 7/2008 |
| WO | WO 2010/050595 A1 | 5/2010 |
| WO | WO 2010/074247 A1 | 7/2010 |

OTHER PUBLICATIONS

Udai Tanaka, Toshiaki Sogabe, Haruo Sakagoshi, Masayuki Ito, Tetsuro Tojo, Anode property of boron-doped graphite materials for rechargeable lithium-ion batteries, Carbon, vol. 39, Issue 6, May 2001, pp. 931-936, ISSN 0008-6223, http://dx.doi.org/10.1016/S0008-6223(00)00211-6. (http://www.sciencedirect.com/science/article/pii/S0008622300002116).*

Ariyoshi et al., "Twelve-Volt 'Lead-Free' Accumulators consisting of LTO and LAMO: High and Low Temperature Examinations," Proceedings of the 48th Battery Symposium in Japan, 1A11, Nov. 13, 2007, 16-17.

Ariyoshi et al., "Cycleability on the LTO/LAMO Cells for 12V 'Lead-Free' Accumulators," Proceedings of the 76th Meeting of The Electrochemical Society of Japan, 1P29, Mar. 26, 2009, with English translation of excerpt.

Besenhard et al., "Filming mechanism of lithium-carbon anodes in organic and inorganic electrolytes," Journa of Power Sources, 1955, 54:228-231.

Hishiyama et al., "Structure and Microtexture of Upilex-derived Carbon Heat-Treated at 3000° C." Proceedings of The 23rd Annual Meeting of the Carbon Society of Japan, 1C14, Dec. 3, 1996, 110-111, with English summary on first page.

Hishiyama et al., "Structure and texture of graphite layer with submicron thickness formed on surface of glass-like carbon," Proceedings of The 29th Annual Meeting of the Carbon Society of Japan, 2C08, Dec. 4, 2002, 192-193, with English translation of excerpts.

Kobayashi et al., "Change of charge-discharge region for lithium ion secondary batteries by high-temperature storage," Proceedings of The 71st Meeting of The Electrochemical Society of Japan, 2I07, Mar. 24, 2004, 241, with English translation of excerpts.

Nakajo, Minoru, "Raman spectroscopy," Tanso, 1977, 90:105-113, with English translation of excerpts.

Oshita et al., "Development of Lithium Ion Batteries Using Natural Graphite as a Negative Electrode Material," Proceedings of The 35th Battery Symposium in Japan, 2B04, Nov. 14, 1994, 37-38, with English summary on first page.

Yokono et al., "Characterization of Pitch II. Chemical Structure," Tanso, 1981, 105:73-81, with English translation of excerpts.

Japanese Office Action and English Language Translation dated Jun. 18, 2013 (4 pages).

* cited by examiner

CARBON MATERIAL FOR NEGATIVE ELECTRODE OF LITHIUM SECONDARY BATTERY AND METHOD FOR PRODUCING THE SAME

This application is a continuation of PCT/JP2010/066096, filed on Sep. 16, 2010.

BACKGROUND OF THE INVENTION

1. Field of the Invention

The present invention relates to a carbon material to be used as a negative electrode of a lithium secondary battery and a method for producing the carbon material.

2. Description of the Related Art

Lithium secondary batteries are light weight and have high input/output characteristics compared with conventional secondary batteries such as nickel-cadmium batteries, nickel metal hydride batteries, and lead-acid batteries so that they have been considered promising in recent years as power sources for electric vehicles and hybrid vehicles. Such lithium secondary batteries usually comprises a lithium-containing positive electrode allowing reversible intercalation of lithium and a negative electrode comprising a carbon material. These electrodes are disposed opposite to each other via a non-aqueous electrolyte. Such batteries are therefore assembled in a discharged state so that they cannot discharge without charging. A charge/discharge reaction will next be described with, as an example, a lithium secondary battery comprising lithium cobaltate ($LiCoO_2$) as a positive electrode, a carbon material as a negative electrode, and a lithium-salt-containing non-aqueous electrolyte solution as an electrolyte.

First, during charging of a first cycle, lithium contained in the positive electrode is released to the electrolyte solution (below-described Formula 1) and the positive electrode potential is shifted to the noble direction. At the negative electrode; lithium released from the positive electrode is occluded in the carbon material (below-described Formula 2) and the negative electrode potential is shifted to a less noble direction. Usually, when a difference between the positive electrode potential and the negative electrode potential, that is, battery voltage, reaches a predetermined value, charging is terminated. This voltage is called "charge termination voltage". During discharging, lithium occluded in the negative electrode is released, the negative electrode potential is shifted to a noble direction, the lithium is occluded in the positive electrode again, and the positive electrode potential is shifted to a less noble direction. Discharging, similar to charging, is also terminated when a difference between the positive electrode potential and the negative electrode potential, that is, the battery voltage, reaches a predetermined value. This value is called "discharge termination voltage". The whole reaction formula of charging and discharging as described above is represented by the following Formula 3. In cycles after the first cycle, the charge/discharge reaction (cycle) proceeds by the migration of lithium between the positive electrode and the negative electrode.

(Formula 1)

(Formula 2)

(Formula 3)

In general, carbon materials used as negative electrode materials in lithium secondary batteries are roughly classified into graphite-based ones and amorphous ones. Graphite-based carbon materials have an advantage of high energy density per unit volume compared to amorphous carbon materials. For this reason, graphite-based carbon materials are widely used as negative electrode materials in lithium ion secondary batteries for mobile phones and laptop computers that are compact but require large charge/discharge capacities. Graphite has a structure in which hexagonal network planes of carbon atoms have been stacked regularly one after another and during charging/discharging, intercalation/deintercalation of lithium ions takes place at the edges of the hexagonal network planes.

As described above, using lithium secondary batteries as an electric storage device for automobiles, industries, or power supply infrastructure has been studied briskly. When used for such purposes, they are required to have markedly high reliability compared with the case where they are used for mobile phones or laptop computers. The term "reliability" as used herein means a property related to product life, more specifically, a property not easily undergoing a change in charge/discharge capacity or internal resistance (i.e., not easily undergoing degradation) even when a charge/discharge cycle is repeated, even when the batteries are stored in charged state at a predetermined voltage, or even when they are charged continuously at a predetermined voltage (i.e., even when they are float-charged).

On the other hand, it is generally known that the life characteristics of lithium ion secondary batteries conventionally used for mobile phones or laptop computers largely depend on the material used as a negative electrode. The reason of it is because the charge/discharge efficiency in the positive electrode reaction (Formula 1) and the charge/discharge efficiency in the negative electrode reaction (Formula 2) cannot be made completely equal to each other in principle and the charge/discharge efficiency in the negative electrode is lower. The term "charge/discharge efficiency" as used herein means a ratio of an electric capacity which can be discharged to an electric capacity consumed for charging. A reaction mechanism causing deterioration in life characteristics due to the lower charge/discharge efficiency of the negative electrode reaction will hereinafter be described in detail.

During charging, as described above, lithium in the positive electrode is released (Formula 1) and occluded in the negative electrode (Formula 2). The electric capacity consumed for this charging is equal between the positive- and negative-electrode reactions. The charge/discharge efficiency is however lower in the negative electrode so that in the discharging reaction after the charging, discharging is terminated while a lithium amount released from the negative electrode is less than a lithium amount which can be occluded on the positive electrode, that is, a lithium amount which had been occluded on the positive electrode before the charging. The reason of it is because a part of the electric capacity which has been consumed at the negative electrode for charging is consumed for the side reaction and the competitive reaction and cannot be consumed for a lithium occlusion reaction to the positive electrode, that is, an occlusion reaction as a dischargeable capacity.

As a result of such a charging/discharging reaction, the positive electrode potential when discharge is terminated is shifted to a direction nobler than the potential before the charging/discharging, and the negative electrode potential is also shifted to a direction nobler than the potential before the charging/discharging. This occurs because of the following reasons. All lithium which has been released during charging of the positive electrode cannot be occluded back into or return to the positive electrode. Accordingly, during discharging, although a positive electrode potential which has been shifted to a noble direction during the charging before the discharging is shifted to a less noble direction, the potential cannot return to the original positive electrode potential by an amount corresponding to a difference in a charge/discharge efficiency between the positive electrode and the negative electrode. This leads to termination of the discharging at a potential more noble than the original positive electrode potential. As described above, discharging of a lithium secondary battery is completed at the time when a cell voltage, that is, a difference between positive electrode potential and negative electrode potential, reaches a predetermined value (discharge termination voltage). So, when the positive electrode potential is shifted to the noble direction upon discharge termination, the negative electrode potential will be also shifted similarly to the noble direction.

As described above, such lithium secondary batteries have a problem that when a charge/discharge cycle is repeated, an operation range of the capacity of the positive electrode and the negative electrode changes, resulting in degradation in capacity obtainable within a predetermined voltage range, or within a range of a discharge termination voltage and a charge termination voltage. Such a reaction mechanism of capacity degradation has already been reported in academic meetings or the like (for example, Proceedings of the 48th Battery Symposium in Japan, 1A11, Nov. 13, 2007, and Proceedings of the 76th Meeting of the Electrochemical Society of Japan, 1P29, Mar. 26, 2009). When once operation ranges of the positive/negative electrode potentials change, such changes are irreversible and the operation ranges of the positive/negative electrode potentials do not return to the original ones in principal. There is therefore no means for recovering the capacity, which has made the problem more serious.

The above-described reaction mechanism causing capacity degradation which occurs when the charge/discharge cycle is repeated is basically similar to a reaction mechanism which occurs when a battery is stored under a charged state or a reaction mechanism which occurs when a battery is float-charged. First, when a battery is stored under a charged state, it is known that a capacity lost by a side reaction and a competitive reaction which occur under a charged state (a self discharge amount) is greater in the negative electrode than in the positive electrode so that an operation range of the capacity of the positive/negative electrode changes between before and after storage and the battery capacity after storage decreases (for example, Proceedings of the 71st Meeting of the Electrochemical Society of Japan, 2I07, Mar. 24, 2004). A difference in self discharge rate between the positive and negative electrodes under a charged state owes to, similar to the above-mentioned difference in charge/discharge efficiency between the positive and negative electrodes, the fact that a side reaction or competitive reaction rate at the negative electrode under a charged state is higher than a side reaction or competitive reaction rate at the positive electrode under a charged state.

Next, when a battery is float-charged, both the positive electrode and negative electrode are charged respectively to have predetermined potentials continuously at the initial stage of charging. In fact, however, a current value (leakage current on the positive electrode side) necessary for keeping the positive electrode potential and a current value (leakage current on the negative electrode side) necessary for keeping the negative electrode potential is different. The reason of it is because as described above, self discharge rates under a charged state are different between the positive electrode and the negative electrode and the self discharge rate of the negative electrode is greater. At the time of float charging, a leakage current on the negative electrode side becomes greater than a leakage current on the positive electrode side so that a negative electrode potential is shifted to the decreasing direction of a leakage current, that is, the noble direction and a positive electrode potential is shifted to the increasing direction of a leakage current, that is, the noble direction. Thus, even if the battery is float-charged, an operation range of the capacity of the positive electrode and the negative electrode changes irreversibly, leading to degradation in battery capacity.

SUMMARY OF THE INVENTION

The present invention has been made for reducing capacity degradation of lithium secondary batteries. An object of the invention is to develop a negative electrode carbon material capable of suppressing capacity degradation which will otherwise occur due to repetition of a charge/discharge cycle, storage under a charged state, and float charging, thereby providing a negative electrode material for applications requiring high-level of reliability such as lithium secondary batteries for automobiles, industries, and power storage infrastructure.

The invention has been made in order to achieve the above-described object. In a first aspect of the present application, there is provided an artificial graphite for a negative electrode of a lithium secondary battery, the graphite having a c-axis crystallite size L (112) of from 2.0 to 4.2 nm as calculated from a (112) diffraction line obtained by X-ray wide-angle diffractometry and having a half-value width ($\Delta v_G$) of from 15 to 19 $cm^{-1}$ for a peak appearing in a wavelength region of 1580 $cm^{-1}$±100 $cm^{-1}$ in Raman spectroscopy using an argon ion laser light having a wavelength of 5145 angstrom.

In a second aspect of the present application, there may be provided an artificial graphite for a negative electrode of a lithium secondary battery, the graphite being produced by at least steps of: subjecting a heavy oil composition to a coking treatment in accordance with a delayed coking process to obtain a coking-treated product; and heat-treating the coking-treated product, wherein the heavy oil composition has normal paraffin content of from 5 to 20 wt % and an aromaticity index (fa) of from 0.3 to 0.65 as determined by the Knight method.

In a third aspect of the present application, there may be provided the artificial graphite for a negative electrode of a lithium secondary battery, wherein the step of heat-treating comprises at least steps of: carbonizing at 1500° C. or less and pulverizing to obtain a carbon fine-particle material; and heating the carbon fine-particle material in an inert gas atmosphere until a maximum temperature reaches 2200 to 2600° C. to obtain the artificial graphite.

In a fourth aspect of the present application, there may be provided a method for producing an artificial graphite for a negative electrode of a lithium secondary battery, comprising at least steps of: subjecting a heavy oil composition to a coking treatment in accordance with a delayed coking process to obtain a coking-treated product; and heat-treating the coking-treated product, wherein the heavy oil composition has normal paraffin content of from 5 to 20 wt % and an aromaticity index (fa) of from 0.3 to 0.65 as determined using the Knight method.

In a fifth aspect of the present application, there may be provided an artificial graphite for the negative electrode of a lithium secondary battery obtained by the producing method.

In a sixth aspect of the present application, there may be provided a lithium secondary battery comprising at least a lithium-containing positive electrode permitting reversible intercalation of lithium, a negative electrode containing the artificial graphite for a negative electrode of a lithium secondary battery and a non-aqueous electrolyte.

The method for producing an artificial graphite according to the aspects can provide a negative electrode carbon material capable of suppressing capacity degradation which will otherwise occur due to repetition of a charge/discharge cycle, storage under a charged state, and float charging.

DESCRIPTION OF THE PREFERRED EMBODIMENTS

According to a first embodiment of the present application, a carbon material has the following physical properties: a c-axis crystallite size L (112) of from 2.0 to 4.2 nm as calculated from a (112) diffraction line obtained by X-ray wide-angle diffractometry; and a half-value width ($\Delta v_G$) of from 15 to 19 cm$^{-1}$ for a peak appearing in a wavelength region of 1580 cm$^{-1}$±100 cm$^{-1}$ in the Raman spectroscopy using an argon ion laser light having a wavelength of 5145 angstrom. This carbon material is characterized in that although the carbon material has a high crystallinity in the surface layer thereof, it has a low crystallinity in the internal bulk thereof. In usual, carbon materials obtained by carbonization and graphitization of a certain organic polymer compound are different in graphitization degree between their surface layer and internal bulk and growth of crystals are more rapid in the surface layer (refer to, for example, Proceedings of the 23rd Annual Meeting of the Carbon Society of Japan, 1C14, Dec. 3, 1996, and Proceedings of the 29th Annual Meeting of the Carbon Society of Japan, 2C08, Dec. 4, 2002). The carbon materials according to the first and second embodiments of the present application make use of this property.

As a known method for producing a carbon material for a negative electrode of a lithium secondary battery, includes steps of: subjecting a predetermined heavy oil composition to a coking treatment; calcining the resulting raw coke at 1400° C.; pulverizing and classifying the calcined coke to obtain particles having a predetermined particle size; and graphitizing the resulting particles at about 2400° C. (for example, Japanese Laid-Open Patent Publication No. 2009-87871). In such graphite powder obtained by pulverizing and classifying raw coke or calcined coke and then graphitizing the resulting particles, the crystallinity is different between the surface of the particle (surface layer) and the inside of the particle (bulk), and the crystallinity is usually higher in the particle surface. The crystallinity of the particle surface can be evaluated based on the half-value width ($\Delta v_G$) for a peak appearing in a wavelength region of 1580 cm$^{-1}$±100 cm$^{-1}$ in the Raman spectroscopy using an argon ion laser light having a wavelength of 5145 angstrom and the crystallinity inside the particle can be evaluated based on the crystallite size L (112) calculated from the (112) diffraction line obtained by X-ray wide-angle diffractometry. It is generally known that as the completeness of graphite crystals present locally in the particle surface is higher, the half-value width ($\Delta v_G$) becomes smaller (for example, Minoru Nakajo, Tanso, 90, 105, 1977).

A high graphitization degree of the surface layer means that an exposed region of the edge of crystallites in the surface layer is small. In general, crystallites have, at the edge thereof, a number of dangling bonds. In other words, in the crystallites, a valence electron bond is not saturated and many localized electrons are present without a binding partner. The present inventors have found that, during charging, in the surface of a negative electrode carbon material, that is, the interface where an electrolyte is brought into contact with the carbon material, there occurs, in addition to the essential charging reaction causing intercalation of lithium in graphite crystals, a side reaction or competitive reaction because the localized electrons catalytically act to cause reduction decomposition of the electrolyte, which leads to a decrease in a charge/discharge efficiency of the negative electrode. The present inventors have also found that a drastic improvement in this charge/discharge efficiency can be achieved when the crystallinity in the particle surface is increased to a high level, in other words, when the $\Delta v_G$ in the Raman spectroscopy decreases below a predetermined value. The $\Delta v_G$ exceeding 19 cm$^{-1}$ is not preferred because it suddenly increases the possibility of occurrence of the side reaction or competitive reaction due to a reductive decomposition of the electrolyte in the particle surface. Thus, the $\Delta v_G$ is preferably as small as possible. But as will be described later, the present inventors could not obtain a carbon material having a $\Delta v_G$ less than 15 cm$^{-1}$, though they studied various synthesis processes. Therefore according to the first embodiment of the present application, it is preferable that the $\Delta v_G$ falls within a range of from 15 to 19 cm$^{-1}$.

In addition, the negative electrode carbon material has a crystallite size L (112) of from 2.0 to 4.2 nm as calculated from the (112) diffraction line obtained by X-ray wide-angle diffractometry. The reason why the crystallite size is so selected will next be described in detail.

It is generally known that in negative electrode carbon materials for lithium secondary batteries, when lithium intercalates between crystal layers of graphite during charging, solvent molecules of the electrolyte also co-intercalate and as a result, they are subjected to reductive decomposition between the crystal layers (for example, J. O. Besenhard, M. Winter, J. Yang, W. Biberacher, J. Power Sources, 54, 228, 1955). Since reductive decomposition of the co-intercalated solvent easily occurs between the crystal layers of graphite, a charge/discharge efficiency inevitably decreases significantly.

On the other hand, in graphite powder synthesized by the producing method described in Japanese Laid-Open Patent Publication No. 2009-87871, that is, pulverizing and classifying raw coke or calcined coke and then graphitizing the resulting particles, an excessive increase in the crystallinity inside the particle (bulk), in other words, the size L (112)

exceeding 4.2 nm, is not preferred. This is because the above-described co-intercalation phenomenon tends to occur during charging and the co-intercalated solvent and the like are subjected to reductive decomposition between crystal layers as described above, resulting in a marked decrease in charge/discharge efficiency.

In addition, it is generally known that a chargeable/dischargeable capacity of negative electrode carbon materials is smaller with a decrease in the size of the crystallite calculated using X-ray wide-angle diffractometry (for example, Proceedings of the 35th Battery Symposium in Japan, 2B04, Nov. 14, 1994). This tendency can also be recognized in the carbon material according to the first embodiment of the present application. More specifically, the size L (112) smaller than 2.0 nm is not preferred because in this case, a chargeable/dischargeable capacity decreases.

According to the first embodiment of the present application, because of the above-described reasons, the size L (112) of the crystallite as calculated from the (112) diffraction line obtained using X-ray wide-angle diffractometry is to from 2.0 to 4.2 nm. With regard to the electrochemical properties of graphite powder having L (112) of from 2.0 to 4.2 nm and $\Delta v_G$, as mentioned above, of from 15 to 19 $cm^{-1}$ as a negative electrode, a reversibly chargeable/dischargeable capacity can be large, and co-intercalation of solvent molecules during charging or a side reaction or competitive reaction due to dangling bonds in the particle surface can be suppressed. As a result, using graphite powder having such physical properties as a negative electrode of lithium secondary batteries can suppress capacity degradation which might occur due to a negative electrode, even when a charge/discharge cycle is repeated, batteries are stored under a charged state, or float charging is performed, and accordingly can improve reliability.

According to the second embodiment of the present application, a material oil composition for obtaining the carbon material according to the first embodiment can be obtained. Provided in the second embodiment of the present application may be an artificial graphite for a negative electrode of a lithium secondary battery produced by at least a step of subjecting a heavy oil composition to a coking treatment in accordance with a delayed coking process to obtain a coking-treated product, and a step of heat-treating the coking-treated product, wherein the heavy oil composition has normal paraffin content of from 5 to 20 wt % and an aromaticity index, as determined by the Knight method, of from 0.3 to 0.65.

A method for producing a negative electrode carbon material of lithium secondary batteries, including a step of "subjecting a heavy oil composition to a coking treatment in accordance with a delayed coking process to obtain a coking-treated product and then a step of heat-treating the coking-treated product" is generally known (the above-described Japanese Laid-Open Patent Publication No. 2009-87871). This producing method is well suited for mass production of a high-quality carbon material and a wide variety of coke products can be mass produced using this method. Finding that by controlling the physical properties and composition of the heavy oil composition and coking conditions to fall within appropriate ranges, the carbon material according to the first embodiment of the present application can be produced making use of the producing method, the present inventors have arrived at the second embodiment of the present application.

The carbon material according to the first embodiment of the present application is, as described above, characterized in that the graphitization degree of the particle surface (surface layer) is considerably higher than that inside the particle (bulk). In order to produce graphite powder having such a physical characteristic that the graphitization degree of the particle surface (surface layer) is considerably higher than that inside the particle (bulk), it is the common practice, as described above, to pulverize and classify raw coke or calcined coke to adjust granularity and then graphitize the resulting particles. Graphitization after pulverization can make it possible to make the graphitization degree of the particle surface (surface layer) of the graphite powder higher than that inside the particle (bulk). The term "raw coke" as used herein means coke obtained by thermally decomposing a heavy oil by using a delayed coker, while the term "calcined coke" as used herein means coke obtained by carbonizing raw coke in an industrial furnace, removing water and volatile components, and thereby developing the crystal structure. On the other hand, graphite powder obtained by pulverization after graphitization may not be preferred because since a dynamic energy derived from pulverization is given to the particle surface and the graphitization degree of the particle surface therefore becomes lower than that inside the particle, graphite powder having physical properties according to the first embodiment of the present application cannot be obtained.

However, only graphitization after pulverization and classification of raw coke or calcined coke can only provide graphite powder having a graphitization degree higher in the particle surface than in the particle inside. It may be impossible to obtain graphite powder having the physical characteristic according to the first embodiment of the present application, that is, a significantly higher graphitization degree in particle surface (surface layer) than in particle inside (bulk). This is because when coke is pulverized, lattice defects or unorganized carbon which can be introduced into a crystallite in the surface layer of the particle may impair the development of the crystallite in the surface layer. The term "unorganized carbon" as used herein means carbon not incorporated in a planar hexagonal network of carbon and unorganized carbon is characterized in that it is a carbon atom gradually incorporated in a planar hexagonal network of carbon with an increase in the treatment temperature while interfering with growth or selective orientation of carbon crystallites adjacent to the unorganized carbon.

As a result of studying the producing method of graphite powder, the present inventors have found that graphite powder having, in the surface layer thereof, a highly developed crystal structure can be obtained by controlling the crystal structure of raw coke or calcined coke, which is to be pulverized, into a structure resistant to introduction of lattice defects or unorganized carbon in the surface layer even when a dynamic energy derived from pulverization is given to the particle surface. They have also found that this structure can be realized by controlling the producing method of raw coke or calcined coke.

Such a structure is a crystal structure comprising crystallites obtained by stacking planar hexagonal networks of a relatively small size to one after another and having a selective orientation. When the crystal structure has such a structure, even when a dynamic energy derived from pulverization is added, cracks between two crystallites adjacent to each other may occur with high probability because the planar hexagonal networks to be stacked are small. This can make it possible to significantly reduce the probability of the planar hexagonal network being cleaved or the probability of cracks appearing in the planar hexagonal network. When the raw coke or calcined coke to be pulverized has a crystal structure comprising crystallites obtained by stacking planar hexagonal networks of a relatively large size one after another, a dynamic energy derived from pulverization is likely to be applied to the planar hexagonal networks of a relatively large size and the probability of applying the energy to two adjacent crystallites decreases, resulting in an increase in the probability of the planar hexagonal network constituting the crystallite being cleaved or the probability of cracks appearing in the crystallite. This may not be preferred because it may increase the probability of lattice defects or unorganized carbon being introduced into the surface layer of the coke, making it impossible to heighten the graphitization degree of the surface layer of the graphite powders obtained after graphitization.

Accordingly, it is possible to say that in the second embodiment of the present application, there is concretely defined a producing method for obtaining raw coke or calcined coke to be pulverized which has a crystal structure comprising crystallites having a planar hexagonal network of a relatively small size. Finding that production of raw coke or calcined coke having such a structure in accordance with a delayed coking process suited for mass production can be actualized by controlling the physical properties and coking conditions of a heavy oil composition serving as a raw material, the present inventors have arrived at the second embodiment of the present application.

First, a description is made on the physical properties of the heavy oil composition serving as a raw material. It is characterized in that it has normal paraffin content of from 5 to 20 wt % and an aromaticity index fa, as determined using a specific method, of from 0.3 to 0.65. When a heavy oil is treated at high temperatures, thermal decomposition and polycondensation reactions will occur and after formation of a large liquid crystal referred to as "mesophase" as an intermediate product, raw coke can be produced. At this time, it can be effective to use a material oil composition containing both a heavy oil component producing a good bulk mesophase and another heavy oil component capable of producing a gas having a function of limiting the size of the stack of planar hexagonal networks constituting the mesophase when the bulk mesophase is carbonized and solidified after polycondensation. The heavy oil component producing good bulk mesophase can be a component providing an aromaticity index fa of from 0.3 to 0.65 and the heavy oil component capable of producing a gas corresponds to a component having normal paraffin content of from 5 to 20 wt %.

The term "fa" as used herein means an aromatic carbon fraction or aromaticity index (fa) as determined by the Knight method. In the Knight method, the distribution of carbon is, as the spectrum of aromatic carbon obtained by the $^{13}$C-NMR method, divided into three components (A1, A2, A3), in which A1 corresponds to the number of carbons in an aromatic ring, substituted aromatic carbons, and half of unsubstituted aromatic carbons (corresponding to the peak of about 40 to 60 ppm in $^{13}$C-NMR); A2 corresponds to the other half of the unsubstituted aromatic carbons (corresponding to the peak of about 60 to 80 ppm in $^{13}$C-NMR); and A3 corresponds to the number of aliphatic carbons (corresponding to the peak of about 130 to 190 ppm in $^{13}$C-NMR). Based on them, fa is determined by the following expression: $fa=(A1+A2)/(A1+A2+A3)$. According to the literature: "Characterization of Pitch II. Chemical Structure" Yokono and Sanada, Tanso No. 105, p 73-81 (1981), the $^{13}$C-NMR method is the best method for quantitatively determining fa which is the most basic parameter among the chemical structure parameters of pitches.

The normal paraffin content of the material oil composition is the value measured using a capillary column-mounted gas chromatograph. Specifically, after verification of normal paraffin with a standard substance, a non-aromatic component sample separated by the above elution chromatography is passed through the capillary column for determination. The content can be calculated from this obtained value based on the total mass of the material oil composition.

When the aromaticity index fa is below 0.3, a yield of coke from the heavy oil composition may decrease markedly, a good bulk mesophase cannot be formed, and the growth of a crystal structure may not grow smoothly even by graphitization. Thus, it may not be preferred. When it exceeds 0.65, on the other hand, a number of mesophases may appear rapidly in a matrix during the preparation procedure of raw coke, which may cause drastic coalescence of mesophases instead of single growth thereof. As a result, a coalescence rate of mesophases themselves may exceed a generation rate of a gas derived from the normal-paraffin-containing component, making it impossible to limit the planar hexagonal network of bulk mesophase to a small size. The aromaticities exceeding the above range therefore may not be preferred.

As described above, the aromaticity index fa of the heavy oil composition is preferably from 0.3 to 0.65. A heavy oil composition having a density D of from 0.91 to 1.02 g/cm$^3$ and a viscosity V of from 10 to 220 mm$^2$/sec in addition to an aromaticity index fa of from 0.3 to 0.65 is more preferable.

The normal paraffin component contained in an appropriate amount in the heavy oil composition plays an important role of generating a gas at the time of coking treatment and limiting the bulk mesophase to a small size as described above. The gas thus generated has also a function of monoaxially orientating any two adjacent mesophases having a limited small size and selectively orientating the whole system. Even if the mesophase is limited to a small size, carbonization and graphitization of the particles obtained by pulverization may facilitates growth of the crystal structure particularly in the particle surface layer, so that the normal-paraffin-containing component can be an essential component for achieving the advantage of the invention.

Contents of the normal-paraffin-containing component less than 5 wt % are not preferred because they may cause excessive growth of mesophases, resulting in the formation of a huge planar hexagonal network of carbon. Contents exceeding 20 wt %, on the other hand, are also not preferred because an excess amount of a gas may be generated from normal paraffin and tend to work to disturb the orientation of bulk mesophase, preventing smooth growth of a crystal structure even in carbonization and graphitization. As described above, the normal paraffin content is therefore preferably from 5 to 20 wt %.

The heavy oil having such physical properties as described above can be obtained by subjecting a heavy oil alone to various treatments to satisfy the above-described conditions, or by blending two or more material oils different in kind to satisfy the conditions. Examples of the material oil include bottom oil of fluid catalytic cracking oil (FCC DO), highly hydrodesulfurized heavy oil, vacuum residual oil (VR), coal derived oil, solvent extraction oil of coal, ordinary pressure residual oil, shale oil, tar sand bitumen, naphtha tar pitch, coal tar pitch, ethylene bottom oil, and heavy oils obtained hydrorefining of the foregoing. Highly hydrodesulfurized heavy oil which contains a suitable level of saturated components and a suitable level of normal paraffins in the components, can be preferably used as a gas generating source during solidification. When two or more material oils are blended to provide the material oil composition, the blending ratio may be appropriately adjusted according to the properties of the material oil used. The properties of the material oil will vary depending on the type of crude oil and the treatment conditions employed until the material oil is obtained from the crude oil.

The heavy oil composition of the present embodiment may be subjected to a coking treatment and then, if necessary, to carbonization and graphitization, for use as a carbon material for a negative electrode of a lithium ion secondary battery. The method of subjecting the heavy oil composition capable of satisfying the prescribed conditions to a coking treatment is preferably a delayed coking process. More specifically, the material oil composition is heat-treated under pressurized conditions in a delayed coker to obtain raw coke. The conditions of the delayed coker are preferably a pressure of from 0.1 to 0.8 MPa and a temperature of from 400 to 600° C.

The preferred range of the pressure may be specified because a release rate of a gas generated from the normal paraffin-containing component to the outside of the system can be restricted by pressure. As described above, the size of the planar hexagonal network of carbon constituting mesophase can be limited by a generated gas so that a retention time of the generated gas in the system will be an important control parameter for determining the size of the planar hexagonal network.

The preferred range of the temperature may be specified because the temperature can be important for causing mesophase to grow from the heavy oil adjusted for achieving the advantage of the invention. Coking under conditions outside the temperature range of from 400 to 600° C. or outside the pressure range of from 0.1 to 0.8 MPa may not be preferred because even when a predetermined process is performed to obtain graphite powder after coking, it may be obtain only a low graphitization degree in the surface layer or the graphitization degree in the surface layer may not grow without carrying out graphitization until the size L (112) of the crystallite exceeds 4.2 nm.

As described above, provided in the second embodiment of the present application may be an artificial graphite for a negative electrode of a lithium secondary battery produced by at least a step of subjecting a heavy oil composition to a coking treatment in accordance with a delayed coking process to obtain a coking-treated product, and a step of heat-treating the coking-treated product, wherein the heavy oil composition has normal paraffin content of from 5 to 20 wt % and an aromaticity index fa, as determined by the Knight method, of from 0.3 to 0.65.

The heat treatment conducted in this embodiment is a treatment for obtaining a graphite material with a stable quality by heating raw material powder to remove a volatile component therefrom and then conducting dehydration, thermal decomposition, and solid phase graphitization reaction. It means a series of heat treatment procedures including carbonizing at 1500° C. or less, preferably from 500 to 1500° C. and then graphitizing at 2000° C., that is, a graphitization starting temperature, or greater, preferably a maximum temperature of from 2200 to 2600° C. Preferred examples of the heat treatment procedures for obtaining a graphite material as shown in the first embodiment include carbonizing a heavy oil composition, which has been subjected to coking treatment, at from 500 to 1500° C. in an inert gas atmosphere such as nitrogen or argon, pulverizing and classifying the carbonized product into particles having an average particle size of 50 μm or less, and graphitizing the resulting particles in an inert gas atmosphere at the maximum temperature of from 2200 to 2600° C.

In particular, it is preferable to carry out pulverization and classification treatments at the stage of a starting material before graphitization treatment and then graphitization, and it is desired not to carry out pulverization after graphitization in such a way as to introduce a strain in the crystal structure. Because in the graphite powder produced by such a method, compared with the graphite powder obtained by graphitization treatment and then pulverization and granularity adjustment, a lattice strain is not easily introduced into a crystal region in the particle surface and the $\Delta v_G$ as measured using the Raman spectroscopy can be suppressed to a small value. The particle size is preferably set at 50 μm or less because this is an ordinary particle size which such graphite materials are required to have.

A description will next be made on a lithium ion secondary battery using a carbon material for a negative electrode of a lithium ion secondary battery obtained from a raw material carbon composition according to the invention.

A method for producing a negative electrode of a lithium ion secondary battery includes, but not limited to, pressure molding of a mixture (negative electrode mixture) containing the carbon material according to the present invention, a binder (binding agent), and if necessary a conductive aid and organic solvent into a predetermined size. Alternatively, a method for producing a negative electrode may include kneading of the carbon material according to the present invention, a binder (binding agent), a conductive aid, and the like in an organic solvent to obtain a slurry, rolling the slurry which has been applied and dried (negative electrode mixture) on the collector such as copper foil, and then cutting the roll into a predetermined size.

Examples of the binder (binding agent) include polyvinylidene fluoride, polytetrafluoroethylene, and SBR (styrene-butadiene rubber). A content of the binder in the negative electrode mixture may be set as needed in consideration of battery design to fall within a range of from about 1 to 30 parts by mass based on 100 parts by mass of the carbon material.

Examples of the conductive aid include carbon black, graphite, acetylene black, indium-tin oxide exhibiting conductivity, and conductive polymers such as polyaniline, polythiophene and polyphenylenevinylene. The using amount of the conductive aid is preferably from 1 to 15 parts by mass based on 100 parts by mass of the carbon material.

Examples of the organic solvent include dimethylformamide, N-methylpyrrolidone, isopropanol, and toluene.

The carbon material and the binder and if necessary the conductive aid, and the organic solvent may be mixed using a known apparatus such as a screw-type kneader, ribbon mixer, universal mixer, or planetary mixer. The mixture thus obtained is then rolled or pressed to be molded. The pressure upon rolling or pressing is preferably from about 100 to 300 MPa.

The material of the collector is not particularly limited and any material can be used insofar as it does not form an alloy with lithium. Examples include copper, nickel, titanium, and stainless steel. The form of the collector is also not particularly limited and examples may include a foil, a perforated foil, or a mesh formed as a band. A porous material such as a porous metal (metal foam) or carbon paper may also be used as the collector.

Examples of the method of coating the collector with the slurry include, but not particularly limited to, known methods such as metal mask printing, electrostatic coating, dip coating, spray coating, roll coating, doctor blading, gravure coating, screen printing, and die coating. After coating, it is the common practice to carry out rolling treatment with a flat press, calender roll, or the like if necessary.

Also, integration of the collector with the slurry of the negative electrode slurry obtained in the form of a sheet, pellets, or the like may be carried out by a known method using, for example, a roll or press, or a combination thereof.

A lithium ion secondary battery using the carbon material for the negative electrode of a lithium ion secondary battery according to the present embodiment can be obtained, for example, by placing a negative electrode produced in the manner described above and a positive electrode so as to face them to each other via a separator, and pouring an electrolyte solution between them.

Any active material may be used with no particular limitation for the positive electrode, and for example, a metal compound, metal oxide, metal sulfide or a conductive polymer material capable of doping or intercalating lithium ions may be used. Examples include lithium cobaltate ($LiCoO_2$), lithium nickelate ($LiNiO_2$), lithium manganate ($LiMn_2O_4$), complex oxides ($LiCo_XNi_YMn_ZO_2$, X+Y+Z=1), lithium vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine-type $LiMPO_4$ (M:Co, Ni, Mn, Fe), conductive polymers such as polyacetylene, polyaniline, polypyrrole, polythiophene, and polyacene, and porous carbon, and mixtures thereof.

Examples of the separator include nonwoven fabrics, cloths and microporous films composed mainly of a polyolefin such as polyethylene or polypropylene, and combinations thereof. It is not necessary to use a separator if the positive electrode and negative electrode of a lithium ion secondary battery to be fabricated is not in direct contact.

As the electrolyte solution and electrolyte used in the lithium secondary battery, known organic electrolyte solution, inorganic solid electrolyte, or a polymer solid electrolyte can be used. An organic electrolyte solution is preferable from the viewpoint of electrical conductivity.

Examples of the organic electrolyte solution include organic solvents, for example, ethers such as dibutyl ether, ethylene glycol monomethyl ether, ethylene glycol monoethyl ether, ethylene glycol monobutyl ether, diethylene glycol monomethyl ether, and ethylene glycol phenyl ether; amides such as N-methylformamide, N,N-dimethylformamide, N-ethylformamide, N,N-diethylformamide, N-methylacetamide, N,N-dimethylacetamide, N-ethylacetamide, and N,N-diethylacetamide; sulfur-containing compounds such as dimethyl sulfoxide and sulfolane; dialkylketones such as methyl ethyl ketone and methyl isobutyl ketone; cyclic ethers such as tetrahydrofuran and 2-methoxytetrahydrofuran; cyclic carbonates such as ethylene carbonate, butylene carbonate, propylene carbonate, and vinylene carbonate; linear carbonates such as diethyl carbonate, dimethyl carbonate, methylethyl carbonate, and methylpropyl carbonate; cyclic carboxylic acid esters such as γ-butyrolactone and γ-valerolactone; linear carbonic acid esters such as methyl acetate, ethyl acetate, methyl propionate, and ethyl propionate; N-methyl-2-pyrrolidinone; acetonitrile; and nitromethane. These solvents may be used either singly or in combination.

As a solute of these solvents, various lithium salts may be used. Examples of known lithium salts include $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(CF_3SO_2)_2$, and $LiN(C_2F_5SO_2)_2$.

Examples of the polymer solid electrolyte include polyethylene oxide derivatives and polymers containing these derivatives, polypropylene oxide derivatives and polymers containing these derivatives, phosphoric acid ester polymers, and polycarbonate derivatives and polymers containing these derivatives.

There is absolutely no limitation on the selection of members which are other than those described above but necessary for constituting the battery.

The lithium ion secondary battery typically has, but not limited to, a structure in which a positive electrode and a negative electrode, each in band form, are wound in a spiral manner via a separator to form a wound electrode group and inserted in a battery case, and the case is sealed, or a structure in which a positive electrode and a negative electrode, each in a flat plate form, are stacked successively via a separator to form a stacked polar plate group and encased in an outer casing. Lithium ion secondary batteries are used, for example, as paper cells, button cells, coin cells, stacked cells, cylindrical cells, square cells, or the like.

A lithium ion secondary battery using the carbon material according to the present application can have high-level reliability compared with a lithium ion secondary battery using a conventional carbon material so that it can be used industrially in automobiles, more specifically, hybrid vehicles, plug-in hybrid vehicles, or electric vehicles, or for power storage infrastructure.

EXAMPLES

The present invention will next be described in more detail based on examples and comparative examples. It should however be borne in mind that the invention is not limited to or by the following examples.

<Measurement of Physical Properties>

(1) Calculation of the Crystallite Size L (112) of Graphite Powder

The crystallite size L (112) of graphite powder was calculated by mixing the graphite powder with 10 wt % of a Si reference sample as an internal standard, filling a rotary sample holder (25 mm diameter×0.2 mm t) made of glass with the resulting mixture, and carrying out measurement using wide-angle X-ray diffractometry based on JIS R7651 (2007). "D8 ADVANCE (sealed tube type)", product of Bruker-AXS was used as an X-ray diffractometer, CuKα radiation (Kβ filter Ni was used) was used as an X-ray source, and an applied voltage and current to an X-ray vacuum tube were set at 40 kV and 40 mA, respectively.

The diffraction pattern thus obtained was analyzed using a method also based on JIS R7651 (2007). Described specifically, the data thus obtained were processed by smoothing and background removal and then by absorption correction, polarization correction, and Lorentz correction, the peak position and value width of the Si reference sample (422) were used for correction against the diffraction curve (112) of the graphite powder, and the crystallite size was determined. The crystallite size was calculated from the corrected peak half-value width using the following Scherrer equation. The measurement and analysis were each conducted three times and the average was designated as L (112).

$$L = K \times \lambda / (\beta_O \times \cos \theta_B) \qquad \text{Scherrer equation}$$

wherein, L represents a crystallite size (nm); K represents a form factor constant (=1.0); λ represents a X-ray wavelength (=0.15406 nm); $\theta_B$ represents a Bragg angle; and $\beta_O$ represents a half-value width (corrected value).

Measurement results of L (112) of the graphite powders described in Examples and Comparative Examples are as shown in Table 1.

(2) Raman Spectroscopy of Graphite Powder

Raman spectroscopy was performed with an $Ar^+$ laser (excited wavelength: 514.5 nm) as a light source. The analysis was made in a macro mode and a laser spot size was about 100 μm in order to acquire average data from the whole laser irradiation range. For the analysis, "Ramanor T-64000" (Jobin Yvon/Atago Bussan) was used at a disposition of 60° and a laser power of 10 mW.

In the Raman spectrum thus obtained, the half-value width $\Delta v_G$ of a peak appearing in a wavelength region of 1580 $cm^{-1} \pm 100$ $cm^{-1}$ was directly read using the least squares method and calculated. Measurement and analysis were each performed three times and an average value was designated as $\Delta v_G$.

Measurement results of the $\Delta v_G$ of graphite powders described in Examples and Comparative Examples are as shown in Table 1.

(3) Physical Properties of Heavy Oil Composition

The normal paraffin content of the material oil composition was measured using a capillary column-mounted gas chromatograph. Specifically, after verification of normal paraffin with a reference material, a non-aromatic component sample separated by elution chromatography is passed through the capillary column for determination. The content is calculated from this obtained value based on the total weight of the material oil composition.

An aromatic carbon fraction or aromaticity index (fa) is determined by the Knight method. In the Knight method, the distribution of carbon as the spectrum of aromatic carbon obtained by the $^{13}$C-NMR method is divided into three components (A1, A2, A3). A1 corresponds to the number of carbons in an aromatic ring, substituted aromatic carbons, and half of unsubstituted aromatic carbons (corresponding to the peak of from about 40 to 60 ppm of $^{13}$C-NMR). A2 corresponds to the other half of the unsubstituted aromatic carbons (corresponding to the peak of from about 60 to 80 ppm of $^{13}$C-NMR). A3 corresponds to the number of aliphatic carbons (corresponding to the peak of from about 130 to 190 ppm of $^{13}$C-NMR). Based on A1, A2 and A3, fa is determined by the following expression: fa=(A1+A2)/(A1+A2+A3). The normal paraffin content and aromaticity index fa of the material oil of the graphite powder described in all the examples and comparative examples other than. Comparative Example 8 are as shown in Table 1.

<Preparation of Cell for Evaluating Negative Electrode Material and Evaluation Method of Properties>

(1) Preparation of Cell for Evaluating Negative Electrode Material

As a negative electrode material, graphite powder obtained in each of the examples or comparative examples described below, polyvinylidene fluoride (KF#9310, product of Kureha) as a binder, and acetylene black ("Denka Black", product of Denki Kagaku Kogyo) were mixed at a weight ratio of 90:2:8. To the resulting mixture was added N-methyl-2-pyrrolidinone, followed by kneading. A paste obtained from the kneaded mass was applied to one side of a 18-μm thick copper foil and it was dried and rolled. The sheet-like electrode thus obtained was punched out into a piece having a diameter of 15 mm and the piece was used as a working electrode. The resulting working electrode and the other necessary members were dried sufficiently and introduced into a glove box filled with an argon gas having a dew point of −100° C. to assemble a cell for evaluating a negative electrode material. The working electrode was dried at 150° C. for at least 12 hours under reduced pressure, while the other members were dried at 70° C. for at least 12 hours under reduced pressure.

Figure 1:
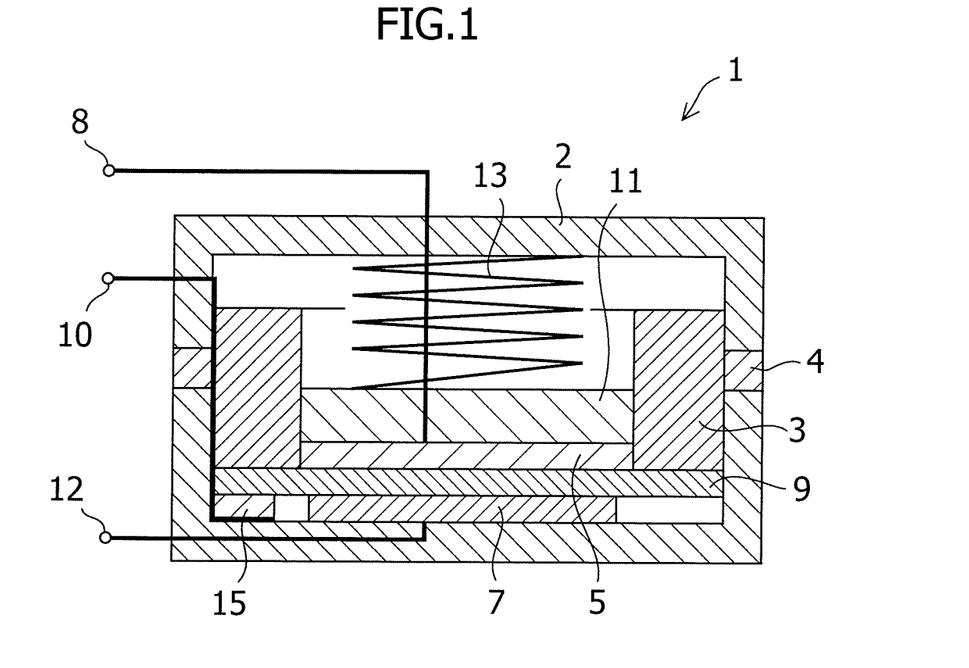
FIG. 1 is a schematic cross-sectional view of a cell used in the evaluation test of negative electrode materials in Examples of the present application.

FIG. 1 is a cross-sectional view of a cell 1 for evaluating a negative electrode material. The cell 1 for evaluation uses, as a container, a hollow metal body 2 inside of which can be kept hermetic with a packing 4 made of ethylene tetrafluoride. In the hollow metal body 2, a reference electrode 15 and the working electrode 7 obtained by the above steps were placed with a space therebetween. Next, a separator 9 made of a microporous film (#2400 product of Cell Guard) having a diameter of 24 mm and made of polypropylene and a counter electrode 5 made of a disc-shaped lithium metal foil having a thickness of 0.7 mm and a diameter of 17 mm were stacked successively on these electrodes. The positional relationship upon stacking of the lithium metal foil over the working electrode was retained with a fixing jig 3 so as to encompass the outer periphery of the working electrode 7 with the outer periphery of the lithium metal foil formed when the lithium metal foil was projected to the working electrode side. Further, terminals 8, 10, and 12 extending from the counter electrode 5, the working electrode 7, and the reference electrode 15 toward the outside the metal frame 2 were provided, respectively.

Then, an electrolyte solution 6 was poured in the hollow metal body 3 and at the same time, the hollow metal body 3 was sealed so that the stack body was pressed with a spring 13 made of stainless via a stainless (SUS304) disc (counter electrode fixing plate) 11 having a thickness of 1 mm and a diameter of 20 mm and the reference electrode 15 obtained by winding a band-shaped lead plate (thickness: 50 μm, width: 3 mm) made of nickel with lithium metal was fixed in the vicinity of the working electrode 7, whereby the cell 1 for evaluating a negative electrode material was prepared. The electrolyte solution 6 used was obtained by dissolving lithium hexafluorophosphate (LiPF$_6$) in a 3:7 (volume ratio) solvent mixture of ethylene carbonate and ethylethylmethyl carbonate to give a concentration of 1 mol/L.

(2) Charge/Discharge Test of Cell for Evaluating Negative Electrode Material

The cell for evaluating a negative electrode material was placed in a temperature controlled room of 25° C. and a charge/discharge test was performed as described below. First, with the area of the working electrode as a standard, current was supplied between the counter electrode and the working electrode at a current value to give a current density of 0.1 mA/cm$^2$ (discharged), and lithium was doped into the working electrode until the potential of the working electrode against the reference electrode became 0.01V. After a pause for 10 minutes, current was supplied at the same current value until the potential of the working electrode against the reference electrode became 1.2V (charged), and lithium migrated to the working electrode was dedoped. The lithium doping capacity (mAh/g) and the lithium dedoping capacity (mAh/g) thus obtained were obtained and a charge/discharge efficiency (%) of the initial charge/discharge cycle was calculated from these values in accordance with the following equation.

$$\text{Charge/Discharge Efficiency} = \frac{\text{Lithium Dedoping Capacity}}{\text{Lithium Doping Capacity}} \times 100 \quad \text{Equation 1}$$

The lithium dedoping capacity and charge/discharge efficiency of the graphite powder described in each of the examples and comparative examples are as shown in Table 1.

<Preparation of Battery and Evaluation Method of Properties>

(1) Preparation of Battery

Figure 2:
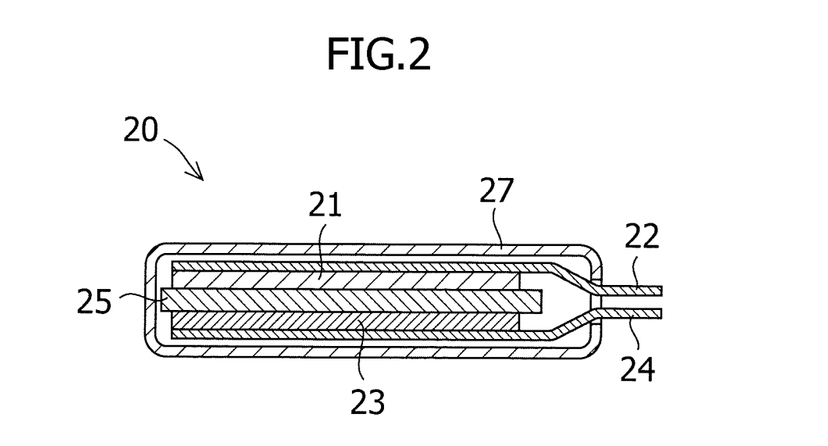
FIG. 2 is a schematic cross-sectional view of a cell used in the evaluation test of batteries in Examples of the present application.

FIG. 2 is a cross-sectional view of a cell 20 after preparation. A positive electrode 21 is a sheet electrode obtained by mixing lithium nickelate (LiNi$_{0.8}$Co$_{0.15}$Al$_{0.05}$, product of Toda Kogyo) serving as a positive electrode material and having an average particle size of 6 μm, polyvinylidene fluoride ("KF #1320", product of Kureha) as a binder, and acetylene black ("Denka Black", product of Denki Kagaku Kogyo) at a weight ratio of 89:6:5, adding N-methyl-2-pyrrolidinone and kneading the resulting mixture into a paste, coating one side of a 30-μm thick aluminum foil with the resulting paste, and after drying and rolling, cutting the foil so that a coated portion had a size of 30 mm wide and 50 mm long. From a portion of this sheet electrode, the positive electrode mixture is scraped off in a direction perpendicular to the longitudinal direction of the sheet. The exposed aluminum foil is integrally connected to a collector 22 (aluminum foil) at the coated portion and plays a role as a positive electrode lead plate.

A negative electrode 23 is a sheet electrode obtained by mixing the graphite powder obtained in each of the examples or comparative examples as a negative electrode material, polyvinylidene fluoride ("KF#9310", product of Kureha), and acetylene black ("Denka Black", product of Denki Kagaku Kogyo) at a weight ratio of 90:2:8, adding N-methyl-2-pyrrolidinone and kneading the resulting mixture into a paste, coating one side of a 18-μm thick copper foil with the resulting paste, and after drying and rolling, cutting the foil so that a coated portion had a size of 32 mm wide and 52 mm long. From a portion of this sheet electrode, the negative electrode mixture is scraped off in a direction perpendicular to the longitudinal direction of the sheet. The exposed copper foil is integrally connected to a collector 24 (copper foil) at the coated portion and plays a role as a negative electrode lead plate.

The battery 20 was prepared by drying the positive electrode 21, the negative electrode 23, a separator 25, an exterior part 27, and another part sufficiently and introducing them in a glove box filled with an argon gas having a dew point of −100° C. The positive electrode 21 and the negative electrode 23 were dried at 150° C. for at least 12 hours under reduced pressure, while the separator 25 and other members were dried at 70° C. for at least 12 hours under reduced pressure.

The positive electrode 21 and the negative electrode 23 thus dried were stacked so as to face the coated portion of the positive electrode and the coated portion of the negative electrode to each other with a microporous film (#2400, product of Cell Guard) made of polypropylene therebetween and they were fixed with a polyimide tape. It is to be noted that the positive electrode and the negative electrode were stacked and faced to each other so that the peripheral portion of the positive electrode coated portion to be projected to the coated portion of the negative electrode is encompassed with the inner side of the peripheral portion of the negative electrode coated portion. A monolayer electrode body thus obtained was sealed in an aluminum laminate film and an electrolyte solution was poured. While the positive- and negative-electrode lead plates protrude outside, the laminate film was hot melted to obtain a hermetically closed type monolayer laminate-film battery. The electrolyte solution used was obtained by dissolving lithium hexafluorophosphate ($LiPF_6$) in a 3:7 (volume ratio) solvent mixture of ethylene carbonate and ethylmethyl carbonate to give its concentration of 1 mol/L.

(2) Evaluation of a Battery

The battery thus obtained was placed in a temperature-controlled room set at 25° C. and a charge-discharge test was made as described below. First, the battery was charged with a constant current of 1.5 mA until the battery voltage reached 4.2V. After a pause for 10 minutes, the battery was discharged with the same constant current until the battery voltage reached 3.0V and this charge/discharge cycle was repeated 10 times. This charge/discharge cycle was performed to detect the abnormality of the battery so that it was not included in the number of cycles of the charge/discharge cycle test. It was found that all the batteries prepared in the present examples showed no abnormality.

The next charge/discharge cycle was designated as a first cycle (initial cycle). The battery was charged with a constant current of 75 mA until the battery voltage reached 4.2V. After a pause for 1 minute, the battery was discharged with the same constant current until the cell voltage reached 3.0V and this charge/discharge cycle was repeated 1000 times. A ratio (%) of the 1000-th cycle discharge capacity relative to the initial discharge capacity was calculated as a capacity-maintenance ratio of the charge/discharge cycle. The capacity-maintenance ratio of the charge/discharge cycle of the battery using, as the negative electrode, graphite powders obtained in Examples and Comparative Examples is shown in Table 1.

<Producing Method of Graphite Powder in Examples and Comparative Examples>

Comparative Example 1

A hydrodesulfurized oil was obtained by subjecting an atmospheric distillation residual oil having a sulfur content of 3.1 mass % to hydrodesulfurization in the presence of a catalyst to give its hydrogenolysis rate of 25% or less. The hydrodesulfurization was conducted at a total pressure of 180 MPa, a hydrogen pressure of 160 MPa, and a temperature of 380° C. Separately, a fluid catalytic cracking residual oil was obtained by distilling an atmospheric distillation residual oil under reduced pressure, hydrodesulfurizing the residue, and subjecting the resulting product (sulfur content: 380 mass ppm, density at 15° C.: 0.83 $g/cm^3$) to fluid catalytic cracking at a reaction temperature of 530° C., a total pressure of 2.3 $kgf/cm^2$, a catalyst/oil ratio of 13, and a contact time of 7 seconds. As the catalyst, a silica/alumina catalyst having platinum supported thereon was used. Then, the hydrodesulfurized oil, the fluid catalytic cracking residual oil, and an ethylene bottom oil were mixed at a mass ratio of 1:3:1 to obtain a heavy oil composition (which will hereinafter be called "material oil composition", simply) to be used as a raw material of coke. The normal paraffin content and aromaticity index fa of the material oil composition are shown in Table 1.

The material oil composition was introduced into a delayed coker and subjected to a coking treatment at 550° C. in an inert gas atmosphere to obtain a raw material carbon composition. The raw material carbon composition was then introduced into a rotary kiln, in which it was calcined at 1400° C. to obtain a carbon material. The carbon material thus obtained was pulverized using a mechanical pulverizer ("Super Rotor Mill", product of Nisshin Engineering) and the particles thus obtained were classified using a precision air classifier ("Turbo Classifier", product of Nisshin Engineering) to obtain a carbon fine-particle material having an average particle size of 12 μm. The carbon fine-particle material was poured in a crucible and the crucible was set in an electric oven. It was heat-treated at a maximum temperature of 2100° C. in a nitrogen gas stream of 80 L/min. The heating rate was 200° C./hour, the retention time of the maximum temperature was 16 hours, and the cooling rate was 100° C./hour until 1000° C. and then, it was allowed to cool to room temperature while keeping the nitrogen gas stream. The heat treatment after obtaining the carbon fine-particle material will hereinafter be called "graphitization". The graphite powder thus obtained is designated as graphite A.

Example 1

In a manner similar to that employed in Comparative Example 1 except that the maximum temperature was set at 2200° C., the carbon fine-particle material obtained as in Comparative Example 1 was graphitized. The graphite powder thus obtained is designated as Graphite B.

Example 2

In a manner similar to that employed in Comparative Example 1 except that the maximum temperature was set at 2400° C., the carbon fine-particle material obtained as in Comparative Example 1 was graphitized. The graphite powder thus obtained is designated as Graphite C.

Example 3

In a manner similar to that employed in Comparative Example 1 except that the maximum temperature was set at 2600° C., the carbon fine-particle material obtained as in Comparative Example 1 was graphitized. The graphite powder thus obtained is designated as Graphite D.

Comparative Example 2

In a manner similar to that employed in Comparative Example 1 except that the maximum temperature was set at 2700° C., the carbon fine-particle material obtained as in Comparative Example 1 was graphitized. The graphite powder thus obtained is designated as Graphite E.

Comparative Example 3

In a manner similar to that employed in Comparative Example 1 except that the raw material carbon composition obtained as in Comparative Example 1 was poured in a crucible and the maximum temperature was set at 2400° C., graphitization was performed. The graphite thus obtained was pulverized using a mechanical pulverizer ("Super Rotor", product of Nisshin Engineering) and the particles thus obtained were classified using a precision air classifier ("Turbo Classifier", product of Nisshin Engineering) to obtain a carbon fine-particle material having an average particle size of 12 μm. The graphite powder thus obtained is designated as Graphite F.

Comparative Example 4

The normal paraffin content and aromaticity index fa of the fluid catalytic cracking residual oil described in Comparative Example 1 are shown in Table 1. In a manner similar to that described in Comparative Example 1 except that the fluid catalytic cracking residual oil was used as the material oil composition, a raw material carbon composition and a carbon fine-particle material were obtained. The carbon fine-particle material was graphitized in a manner similar to that employed in Comparative Example 1 except that the maximum temperature was set at 2400° C. The graphite powder thus obtained is designated as Graphite G.

Example 4

To the fluid catalytic cracking residual oil described in Comparative Example 1 was added the same volume of n-heptane, followed by mixing. The resulting mixture was selectively extracted with dimethylformamide to separate it into an aromatic component and a saturated component. The aromatic component and the hydrodesulfurized oil described in Comparative Example 1 were mixed at a mass ratio of 4:1 to obtain a material oil composition of coke. The normal paraffin content and aromaticity index fa of the material oil composition are shown in Table 1. The material oil was treated in a manner similar to that described in Comparative Example 1 to obtain a raw material carbon composition and a carbon fine-particle material. The carbon fine-particle material was graphitized in a manner similar to that employed in Comparative Example 1 except that the maximum temperature was set at 2400° C. The graphite powder thus obtained is designated as Graphite H.

Comparative Example 5

The hydrodesulfurized oil and the fluid catalytic cracking residual oil described in Comparative Example 1 were mixed at a mass ratio of 3:1 to obtain a material oil composition of coke. The normal paraffin content and aromaticity index fa of the material oil composition are shown in Table 1. The material oil composition was treated in a manner similar to that described in Comparative Example 1 to obtain a raw material carbon composition and a carbon fine-particle material. The carbon fine-particle material thus obtained was graphitized in a manner similar to that employed in Comparative Example 1 except that the maximum temperature was set at 2400° C. The graphite powder thus obtained is designated as Graphite I.

Example 5

To the fluid catalytic cracking residual oil described in Comparative Example 1 was added the same volume of n-heptane, followed by mixing. The resulting mixture was selectively extracted with dimethylformamide to separate it into an aromatic component and a saturated component. The saturated component and the fluid catalytic cracking residual oil described in Comparative Example 1 were mixed at a mass ratio of 1:1 to obtain a material oil composition of coke. The normal paraffin content and aromaticity index fa of the material oil composition are shown in Table 1. The material oil composition was treated in a manner similar to that described in Comparative Example 1 to obtain a raw material carbon composition and a carbon fine-particle material. The carbon fine-particle material was graphitized in a manner similar to that employed in Comparative Example 1 except that the maximum temperature was set at 2400° C. The graphite powder thus obtained is designated as Graphite J.

Comparative Example 6

The hydrodesulfurized oil and the fluid catalytic cracking residual oil described in Comparative Example 1 were mixed at a mass ratio of 4:1 to obtain a material oil composition of coke. The normal paraffin content and aromaticity index fa of the material oil composition are shown in Table 1. The material oil composition was treated in a manner similar to that described in Comparative Example 1 to obtain a raw material carbon composition and a carbon fine-particle material. The carbon fine-particle material thus obtained was graphitized in a manner similar to that employed in Comparative Example 1 except that the maximum temperature was set at 2400° C. The graphite powder thus obtained is designated as Graphite K.

Comparative Example 7

The fluid catalytic cracking residual oil described in Comparative Example 1 was selectively extracted with dimethylformamide to separate it into an aromatic component and a saturated component. The aromatic component and the saturated component were mixed at a mass ratio of 4:1 to obtain a material oil composition of coke. The normal paraffin content and aromaticity index fa of the raw material oil composition are shown in Table 1. The material oil was treated in a manner similar to that described in Comparative Example 1 to obtain a raw material carbon composition and a carbon fine-particle material. The carbon fine-particle material was graphitized in a manner similar to that employed in Comparative Example 1 except that the maximum temperature was set at 2400° C. The graphite powder thus obtained is designated as Graphite L.

Comparative Example 8

A highly-purified commercially-available scale-like natural graphite (solid carbon: 99.6%, ash content: 0.1%, volatile content: 0.3%) from Brazil was pulverized using a mechanical pulverizer ("Super Rotor", product of Nisshin Engineering), followed by classification using a precision air classifier ("Turbo classifier", product of Nisshin Engineering) to obtain a carbon fine-particle material having an average particle size of 12 μm. The graphite powder thus obtained is designated as Graphite M.

<Consideration on Test Results of Examples and Comparative Examples>

The graphite powders in Comparative Example 1, Examples 1 to 3, and Comparative Example 2 were obtained from the same material oil composition but the different graphitization temperatures were set. Graphite A of Comparative Example 1 has L (112) of 1.5 nm and $\Delta v_G$ of 22.3 cm$^{-1}$, which are both outside the ranges of the first embodiment according to the present application, that is, L (112) of from 2 to 4.2 nm and $\Delta v_G$ of from 15 to 19 cm$^{-1}$.

Although the following consideration does not limit the technical scope of the invention, the reason of a relative decrease of the L (112) to 2 nm or less is presumed that the graphitization temperature was as low as 2100° C. This

TABLE 1

| Graphite | Sample | Material oil composition | | | Graphitization temperature °C. | Graphite crystallization indicator | | Negative electrode material evaluation test Lithium dedoping capacity of negative electrode material evaluating cell (mAh/g) |
|---|---|---|---|---|---|---|---|---|
| | | Normal paraffin content (wt %) | Aromaticity index fa (—) | Hydro-desulfurized oil Mass % | | L(112) (nm) | $\Delta v_G$ (cm$^{-1}$) | |
| A | Comp. Ex. 1 | 13 | 0.42 | 20 | 2100 | 1.5 | 22.3 | 221 |
| B | Ex. 1 | 13 | 0.42 | 20 | 2200 | 2.0 | 19.0 | 290 |
| C | Ex. 2 | 13 | 0.42 | 20 | 2400 | 2.9 | 17.4 | 319 |
| D | Ex. 3 | 13 | 0.42 | 20 | 2600 | 4.2 | 15.0 | 342 |
| E | Comp. Ex. 2 | 13 | 0.42 | 20 | 2700 | 5.3 | 14.5 | 354 |
| F | Comp. Ex. 3 | 13 | 0.42 | 20 | 2400 | 2.5 | 21.3 | 321 |
| G | Comp. Ex. 4 | 4 | 0.72 | 0 | 2400 | 4.7 | 13.6 | 328 |
| H | Ex. 4 | 5 | 0.65 | 20 | 2400 | 4.0 | 15.3 | 325 |
| I | Comp. Ex. 5 | 18 | 0.25 | 75 | 2400 | 2.5 | 19.8 | 312 |
| J | Ex. 5 | 20 | 0.30 | 50 | 2400 | 2.1 | 18.6 | 307 |
| K | Comp. Ex. 6 | 24 | 0.21 | 80 | 2400 | 1.7 | 21.4 | 276 |
| L | Comp. Ex. 7 | 4 | 0.55 | 20 | 2400 | 4.5 | 15.8 | 317 |
| M | Comp. Ex. 8 | — | — | — | — | 32.4 | 18.7 | 365 |

| Graphite | Negative electrode material evaluation test Charge/discharge efficiency of negative electrode material evaluating cell (%) | Battery evaluation test Capacity maintenance ratio of charge/discharge cycle of battery (%) | Remarks |
|---|---|---|---|
| A | 92 | 75 | |
| B | 90 | 93 | |
| C | 89 | 92 | |
| D | 87 | 90 | |
| E | 62 | 72 | |
| F | 78 | 68 | Graphitizing and then pulverizing without calcining |
| G | 74 | 62 | Using only fluid catalytic cracking residual oil |
| H | 85 | 88 | Using 80% of aromatic component of fluid catalytic cracking residual oil |
| I | 91 | 78 | |
| J | 90 | 86 | Using 80% of saturated component of fluid catalytic cracking residual oil |
| K | 86 | 64 | |
| L | 81 | 75 | |
| M | 90 | 69 | Using commercially available natural graphite after pulverization | results in a decrease in the capacity of a negative electrode (lithium dedoping capacity of a cell for evaluating negative electrode material).

The capacity-maintenance ratio of the battery using Graphite A as a negative electrode after 1000 cycles was 75%, a relatively low value. Although the following consideration does not limit the technical scope of the invention, it is presumed that the $\Delta v_G$ is low and there are many exposed portions of the crystallite in the particle surface, meaning many unorganized carbons or dangling bonds so that reductive decomposition of the solvent of the electrolyte solution easily occurs in this region and resistance polarization increases with the repetition of charge/discharge cycles. Thus, when the $\Delta v_G$ of graphite powder used for a negative electrode exceeds the upper limit, that is, 19 cm$^{-1}$ defined in the first embodiment of the present application, cycle degradation of the battery increases undesirably.

Graphites B, C, and D of Examples 1 to 3 are graphite powders produced from the same material oil as that of Comparative Example 1, but are different only in graphitization temperature. The graphitization temperature of them is as high as from 2200 to 2600° C. They have L (112) and $\Delta v_G$ within the scope of the invention of the present application. The capacity (lithium dedoping capacity of a cell for evaluating a negative electrode material) of 290 mAh/g or greater as a negative electrode is ensured and at the same time, batteries using these graphite powders for the negative electrode exhibit a capacity-maintenance ratio of 90% or greater after 1000 cycles. These graphites are therefore preferred.

Graphite E of Comparative Example 2 is a graphite powder produced from the material oil same as that used in Examples 1 to 3, but it was produced at a graphitization temperature higher than that in Examples 1 to 3, that is, 2700° C. Graphite E of Comparative Example 2 has a small $\Delta v_G$. Although the exposed region of the edge surface of the crystallite present in the particle surface is small, the crystallite size L (112) is relatively large so that at the time intercalation of lithium in graphite crystals, the solvent of the electrolyte solution is easily co-inserted in the crystals. The reductive decomposition of the solvent molecules is apt to occur between crystal layers, resulting in a drastic reduction in the initial charge/discharge efficiency (charge/discharge efficiency of cell for evaluating a negative electrode material) to 62%. The capacity-maintenance ratio of a battery using Graphite E for a negative electrode was 72% after 1000 cycles, showing a drastic reduction compared with that of the batteries obtained in Examples 1 to 3 (from 90 to 93%). Although the following consideration does not limit the technical scope of the invention, the reason of the drastic reduction suggests that the reductive decomposition reaction of the solvent co-inserted in the graphite crystals continues even when the charge/discharge cycle is repeated. In other word, in a charging procedure in each cycle, such a side reaction occurs and a reaction product of the side reaction is deposited continuously to increase the resistance polarization whenever the cycle is repeated. As described above, the size L (112) of the negative electrode graphite powder exceeding the upper limit of the first embodiment of the present application, that is, 4.2 nm, is not preferred because cycle degradation of the battery using it becomes worse.

Graphite F of Comparative Example 3 is also graphite powder produced from the material oil same as those used in Examples 1 to 3 and Comparative Examples 1 and 2, but it is different from them that it is pulverized after graphitization. As is apparent from the physical property value of Graphite C obtained in Example 2 which was produced at the same graphitization temperature, the size L (112) of Graphite F is similar to that of graphite C and falls within the scope of the present invention relating to the present application, but its $\Delta v_G$ was 21.3 cm$^{-1}$, greater than that of Graphite C (17.4 cm$^{-1}$). The reason is because due to the pulverization after graphitization, a large amount of dangling bonds or unorganized carbon is introduced into the particle surface of graphite powder. On the other hand, in the production of Graphite C, carbonization at 1400° C. is followed by graphitization so that dangling bonds or unorganized carbon introduced into the particle surface in the carbonization stage are repaired during graphitization and its $\Delta v_G$ decreases.

Reversible capacity, that is, lithium dedoping capacity of a cell for evaluating a negative electrode material, of Graphite F as a negative electrode is similar to that of Graphite C equal in the size L (112) but the capacity-maintenance ratio of the battery using it as a negative electrode is 68% after 1000 cycles, showing a drastic decrease compared with Graphite C. The reason is, as is apparent also from the decrease in $\Delta v_G$, that similar to the case of Graphite A, there are many unorganized carbon or dangling bonds in the particle surface so that reduction decomposition of the electrolyte solvent is apt to occur in this region, which increases resistance polarization with the repetition of charge/discharge cycles.

Graphite G of Comparative Example 4 has a $\Delta v_G$ as small as 13.6 cm$^{-1}$ and a region in which the edge of crystallite is exposed from the particle surface or an unorganized carbon amount is presumed to be small. A reductive decomposition region of the solvent when a charge/discharge cycle is repeated is therefore small so that it is presumed that cycle degradation can be suppressed. The size L (112) is however as large as 4.7 nm and exceeds the upper limit of the first embodiment of the present application. As a result, the capacity-maintenance ratio of the battery after the charge/discharge cycle is as low as 62%, showing large cycle degradation, which is presumed to occur because of the same reason as that of Graphite E of Comparative Example 2.

Graphite I of Comparative Example 5 has a size L (112) within the range of the first embodiment of the present application, but has a $\Delta v_G$ as large as 19.8 cm$^{-1}$ and exceeds the upper limit of the invention of the present application. The capacity-maintenance ratio of the battery after the charge/discharge cycle is as low as 78%, showing large cycle degradation, which is presumed to occur because of the same reason as that of Graphite A of Comparative Example 1.

Graphite K of Comparative Example 6 is the same as Graphite C of Example 2, Graphite H of Example 4, and Graphite J of Example 5 in the heat treatment temperature of 2400° C., but it has a size L (112) below the lower limit of the first embodiment of the present application and at the same time has a $\Delta v_G$ as high as 21.4 and exceeds the upper limit of the invention of the present application. The capacity-maintenance ratio of the battery after the charge/discharge cycle is as low as 64%, showing large cycle degradation, which is presumed to occur because of utterly the same-reason as that of Graphite A of Comparative Example 1.

Graphite L of Comparative Example 7 is the same as Graphite C of Example 2, Graphite H of Example 4, and Graphite J of Example 5 in the heat treatment temperature of 2400° C., but it has a size L (112) exceeding the upper limit of the embodiment of the first invention of the present application. On the other hand, it has a $\Delta v_G$ falling within a range defined in the embodiment of the first invention of the present application, but large cycle degradation similar to the behavior of the battery of Comparative Example 2 or 4 was recognized. It occurs because the L (112) is too large. It is presumed that even if it is a graphite material having a $\Delta v_G$ falling within the range defined in the embodiment of the first invention of the present application, a co-insertion reaction of the solvent cannot be suppressed, reduction decomposition of the solvent occurs between layers of the graphite crystal, and the reaction product of it is deposited continuously during repetition of the charge/discharge cycle so that the resistance of the battery increases, leading to capacity degradation.

Graphite M of Comparative Example 8 has a $\Delta v_G$ falling within the range of the first embodiment of the present application, but it has a size L (112) as large as 32.4 nm and exceeding the upper limit of the invention of the present application. The size L (112) of Graphite M is the greatest among Graphites A to M so that it features the highest charge/discharge capacity (corresponding to lithium dedoping capacity of a cell for evaluating negative electrode material) as a negative electrode. Since the size L (112) is too large, however, the capacity-maintenance ratio of the battery after the charge/discharge cycle is as low as 69%, showing large cycle degradation. The reason of it is presumed to be similar to that of Graphite E of Comparative Example 2.

As described above, as graphite powder to be used for a negative electrode of a lithium secondary battery, those obtained in Examples 1 to 5 having a size L (112) of from 2 to 4.2 nm and a $\Delta v_G$ of from 15 to 19 (within a range defined in the first embodiment of the present application) have a capacity of 290 mAh/g or greater as a lithium dedoping capacity of a cell for evaluating a negative electrode material and at the same time, have a capacity-maintenance ratio of 88% or greater after 1000 cycles of charge/discharge of a battery using the graphite powder as a negative electrode.

In the graphite powders obtained in Comparative Examples 1 to 8 and showing a size L (112) and $\Delta v_G$ outside the scope of the invention of the present application, the initial reversible capacity (corresponding to a lithium dedoping capacity of a cell for evaluating a negative electrode material) of the powders as a negative electrode is from 221 to 365 mAh/g. Particularly in the graphite powders of Comparative Examples 2 and 7, the capacity higher than that of graphite materials of Examples is recognized, but the capacity-maintenance ratio of the battery using the powders as a negative electrode is as low as from 62 to 78% after 1000 cycles of charge/discharge, which clearly shows that the life characteristics are inferior to those of the graphite materials of Examples.

As shown in Table 1, it has been elucidated that the material oil composition for obtaining the graphite materials of Examples preferably falls within the range of the second embodiment of the present application, that is, normal paraffin content of from 5 to 20 wt % and at the same time, an aromaticity index fa of from 0.3 to 0.65. Accordingly, it has been elucidated that when as a producing method for completing the graphite material according to the first embodiment of the present application, the material is obtained by subjecting a heavy oil composition to a coking treatment in accordance with a delayed coking process to obtain a coking-treated product and then heat-treating the coking-treated product, the material oil composition preferably has normal paraffin content of from 5 to 20 wt % and has an aromaticity index fa of from 0.3 to 0.65 as defined in the second embodiment of the present application.

As shown in Comparative Examples 1 to 3, however, even when the normal paraffin content and the aromaticity index of the material oil composition fall within the ranges of the second embodiment of the present application, the graphite material according to the first embodiment of the present application cannot always be obtained. It depends on the graphitization temperature or the order of pulverization treatment step.

It should be appreciated that the entire contents of Japanese Patent Application No. 2009-217842, filed on Sep. 18, 2009, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

We claim:

1. An artificial graphite for a negative electrode of a lithium secondary battery, the graphite having a c-axis crystallite size L (112) of from 2.0 to 4.2 nm as calculated from a (112) diffraction line obtained by X-ray wide-angle diffractometry and having a half-value width $\Delta v_G$ of from 15 to 19 cm$^{-1}$ for a peak appearing in a wavelength region of 1580 cm$^{-1}$±100 cm$^{-1}$ in Raman spectroscopy using an argon ion laser light having a wavelength of 5145 angstrom.

2. The artificial graphite for a negative electrode of a lithium secondary battery according to claim 1, the graphite being produced by at least steps of: subjecting a heavy oil composition to a coking treatment in accordance with a delayed coking process to obtain a coking-treated product; and heat-treating the coking-treated product, wherein the heavy oil composition has normal paraffin content of from 5 to 20 wt % and an aromaticity index fa of from 0.3 to 0.65 as determined by Knight method.

3. The artificial graphite for a negative electrode of a lithium secondary battery according to claim 2, wherein the step of heat-treating comprises at least steps of: carbonizing at 1500° C. or less and pulverizing to obtain a carbon fine-particle material; and heating the carbon fine-particle material in an inert gas atmosphere until a maximum temperature reaches 2200° C. to 2600° C.

4. A lithium secondary battery comprising at least a lithium-containing positive electrode permitting reversible intercalation of lithium, a negative electrode containing the artificial graphite for a negative electrode of a lithium secondary battery according to Claim 1, and a non-aqueous electrolyte.

5. A lithium secondary battery comprising at least a lithium-containing positive electrode permitting reversible intercalation of lithium, a negative electrode containing the artificial graphite for a negative electrode of a lithium secondary battery according to Claim 2, and a non-aqueous electrolyte.

* * * * *